(12) United States Patent  (10) Patent No.: US 8,470,492 B2
Aoto  (45) Date of Patent: Jun. 25, 2013

(54) VOLTAGE DETECTION CONNECTOR FOR A FUEL CELL AND A FUEL CELL ADAPTED FOR SAME

(75) Inventor: Akira Aoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1346 days.

(21) Appl. No.: 12/087,926

(22) PCT Filed: Jan. 9, 2007

(86) PCT No.: PCT/IB2007/000053
§ 371 (c)(1),
(2), (4) Date: Jul. 17, 2008

(87) PCT Pub. No.: WO2007/085922
PCT Pub. Date: Aug. 2, 2007

(65) Prior Publication Data
US 2009/0136822 A1  May 28, 2009

(30) Foreign Application Priority Data
Jan. 25, 2006 (JP) .................. 2006-015811

(51) Int. Cl.
*H01M 8/24* (2006.01)
*H01R 13/00* (2006.01)
(52) U.S. Cl.
USPC ........................................ 429/468; 439/682

(58) Field of Classification Search
USPC ......................................................... 439/682
See application file for complete search history.

(56) References Cited

U.S. PATENT DOCUMENTS

| 5,564,952 | A | 10/1996 | Davis |
| 2003/0048090 | A1 | 3/2003 | Sato et al. |
| 2005/0213409 | A1* | 9/2005 | Wakahoi et al. ............ 365/222 |
| 2006/0084295 | A1* | 4/2006 | Laub et al. .................... 439/79 |

FOREIGN PATENT DOCUMENTS

| JP | 2002-313399 A | 10/2002 |
| JP | 2002-352821 A | 12/2002 |
| JP | 2004-079192 A | 3/2004 |
| JP | 2004-127776 A | 4/2004 |
| JP | 2004-362860 A | 12/2004 |
| WO | WO 2005/069026 A | 7/2005 |

OTHER PUBLICATIONS

Machine translation of JP 2002-313399 A printed Aug. 29, 2011 from AIPN.*

* cited by examiner

*Primary Examiner* — Maria J Laios
(74) *Attorney, Agent, or Firm* — Kenyon & Kenyon LLP

(57) ABSTRACT

A connector of the present invention has a at least one detection terminal that is connected to an electrode provided on the fuel cell, and an insulating connector case housing the detection terminal. The connector case may have either a channel-shaped groove or a protruding guide for mating with, and for causing sliding with a protruding guide or channel-shaped groove provided on the fuel cell when the connector is attached to the fuel cell.

8 Claims, 10 Drawing Sheets

VOLTAGE DETECTION CONNECTOR FOR A FUEL CELL AND A FUEL CELL ADAPTED FOR SAME

This is a 371 national phase application of PCT/IB2007/000053 filed 9 Jan. 2007, claiming priority to Japanese Patent Application No. 2006-015811 filed 25 Jan. 2006, the contents of which are incorporated herein by reference.

BACKGROUND OF THE INVENTION

1. Field of the Invention

The present invention relates to a voltage detection connector for a fuel cell, and to a fuel cell adapted for same.

2. Description of the Related Art

A fuel cell used in electric vehicles and hybrid vehicles, for example, is formed by the stacking multiple electrical generation units known as cells. Each cell has an electrolyte membrane, made of an ion exchange membrane that is sandwiched between an anode and a cathode and further sandwiched outside by a pair of separators. The separators have passages for supplying fuel gas, such as hydrogen gas and the like, and an oxidant gas, such as air, to the anode and to the cathode. By supplying fuel gas and oxidant gas via these passages, a chemical reaction occurs within the cell, and electricity is generated.

Figure 11:
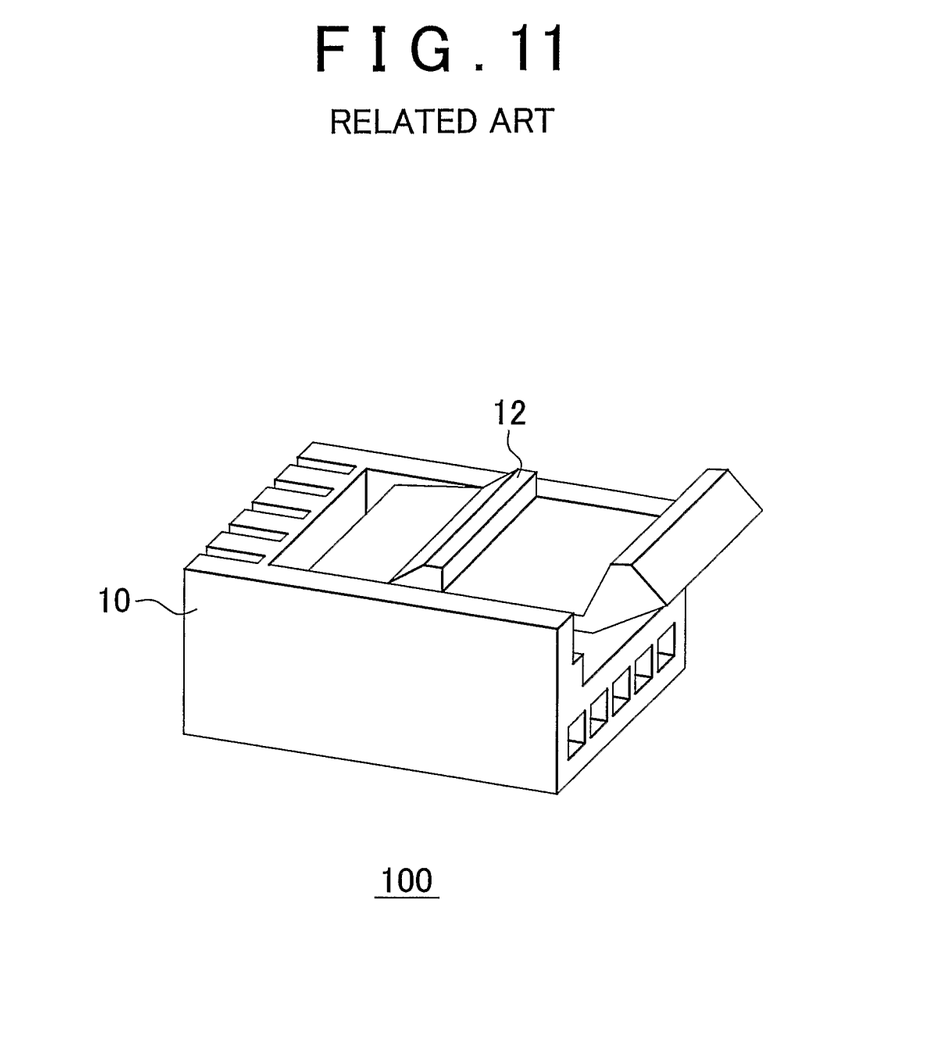
FIG. 11 shows an outer perspective view of a voltage detection connector according to the related art.
Figure 12:
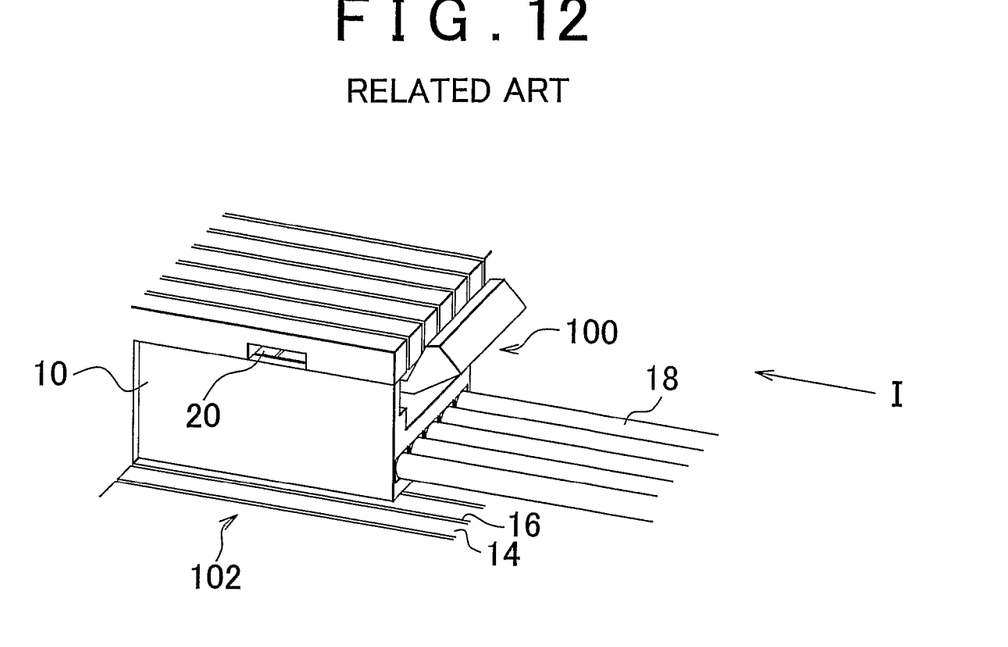
FIG. 12 shows a perspective view indicating a fuel cell to which a voltage detection connector according to the related art is attached.

In such fuel cells, it is necessary to manage the electrical generation condition of each of the cells to control the supply of fuel gas and oxidant gas, and to detect bad cells. The method of doing this is detecting the voltage generated by each cell (hereinafter "cell voltage") and controlling in response to the cell voltage. A connector 100, having a connector case 10, as shown in FIG. 11, is usually used. Connector 100 houses detection terminals (not illustrated) arranged in a row at a spacing that is equal to the spacing of the separators of the plurality of cells. A mating part 12 for locking is provided at the top part of the connector 100. As shown in FIG. 12, the connector 100 is mounted to the fuel cell 102. The detection terminals for detecting the voltage make contact with each of the separators 16 of each cell 14, and electrical leads 18 from each of the detection terminals are used to measure the voltage between the separators 16 to measure the cell voltages. The fuel cell 102 is provided with a mating part 20, made of resin, to which the connector 100 is attached. This mating part 20 mates together with the mating part 12 of the connector 100, thereby fixing the connector 100 to the fuel cell 102. In FIG. 12, in order to clearly show the condition of the attached connector, part of the fuel cell 102 is cut away.

Japanese Patent Application Publication No. JP-A-2002-313399, for example, describes a detection terminal made of a resilient material. The terminal is fixed to a base member that has a mating part mating with a separator, and a linking means for connecting to detection terminals of neighboring cells. Japanese Patent Application Publication No. JP-A-2004-127776 describes a connector for voltage detection, in which a connector and a circuit board are combined within a case.

In the foregoing related art, with attaching the connector 100, it is difficult to view the position of the detection terminals provided thereon. For this reason, proper insertion of the electrodes of the fuel cell into the detection terminal might not be possible, and offset of the attachment position of the connector 100 or other attachment problems can occur.

Figure 13:
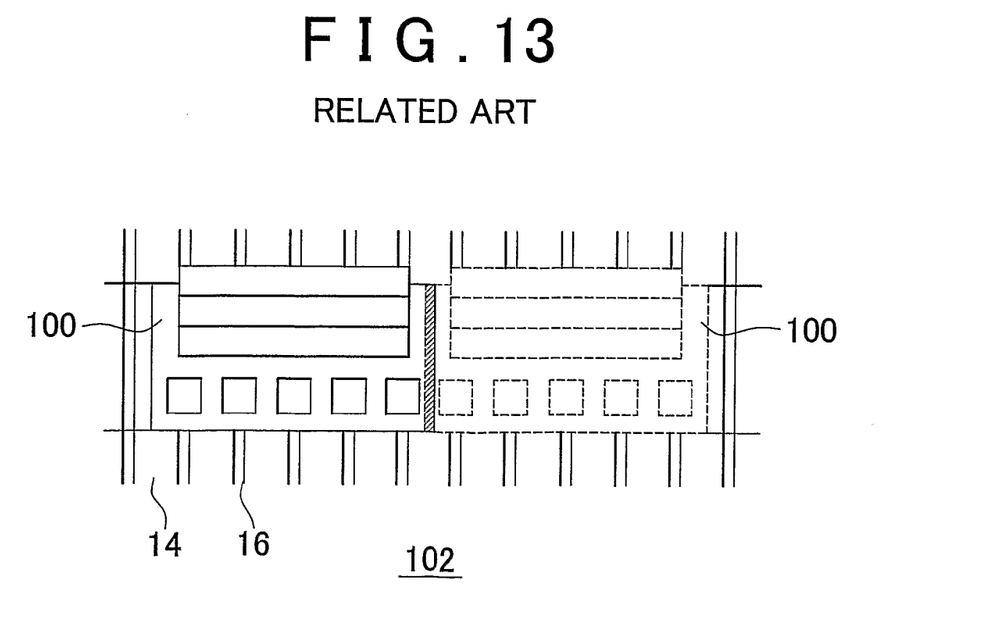
FIG. 13 shows a front view indicating a fuel cell to which a voltage detection connector according to the related art is attached.

In recent years, with improvements in the electrical generation efficiency of the cells making up fuel cells, the thickness of each cell has decreased. When cells become thin, in the case of the connector 100 shown in FIG. 11, as shown in FIG. 13 as viewed in the direction of the arrow I shown in FIG. 12, there is an interfering portion (shown as the hatched area in FIG. 13) in which there is mutual interference between the connector cases 10 of neighboring connectors 100 that are attached. This interference could hinder connection of the connectors 100. If the thickness of the walls of the connector case 10 is made thin, so as to avoid the interference, the strength of the connector 100 becomes insufficient. This could result in problems such as a reduction in the manufacturing yield of the connector 100, and in damage when attaching the connector 100.

SUMMARY OF THE INVENTION

The present invention provides a voltage detection connector for a fuel cell and a fuel cell adapted for the connector, which solve the foregoing problems.

A first aspect of the present invention relates to a voltage detection connector for detecting the voltage of cells contained in a fuel cell formed by the stacking of multiple cells. The connector has at least one detection terminal that is connected to an electrode provided on the fuel cell, and an insulating connector case that houses the detection terminal. The insulating connector case may have either a channel-shaped groove or a protruding guide for mating with and for causing sliding with a protruding guide or channel-shaped groove provided in the fuel cell when the connector is attached to the fuel cell.

The channel-shaped groove or protruding guide provided on the connector case may extend in the insertion direction when attaching the connector to the fuel cell. The channel-shaped groove or protruding guide of the connector case may be provided at a pitch that is substantially equal to the stacking pitch of the cells included in the fuel cell.

A second aspect of the present invention relates to a voltage detection connector for detecting the voltage of cells included in a fuel cell formed by the stacking of multiple cells. The connector case has a first side surface and a second side surface opposite the first side surface. A first protruding part is formed on the first side surface, and a second protruding part is formed on the second side surface. The second protruding part is positioned below the first protruding part and protrudes in the direction opposite to the direction in which the first protruding part protrudes. The connector case has a protruding guide or channel-shaped groove on the lower surface of the first protruding part. In particular, the connector case may have a channel-shaped groove on the upper surface of the second protruding part if a protruding guide is provided on the lower surface of the first protruding part, and a protruding guide on the upper surface of the second protruding part if a channel-shaped groove is provided on the lower surface of the first protruding part.

The channel-shaped groove or protruding guide provided on the connector case may extend in the insertion direction of attachment of the connector to the fuel cell.

A third aspect of the present invention relates to a fuel cell, formed by the stacking of multiple cells, to which a voltage detection connector for detecting a cell voltage is attachable. The fuel cell has either a channel-shaped groove or a protruding guide for mating with and causing sliding with a protruding guide or channel-shaped groove provided in the connector when the connector is being attached.

The channel-shaped groove or protruding guide provided on the fuel cell may extend in the insertion direction when attaching the connector to the fuel cell. The channel-shaped groove or protruding guide provided on the fuel cell may be provided at a pitch substantially equal to the stacking pitch of the cells included in the fuel cell.

According to the present invention, it is possible to easily and properly attach the voltage detection connector to the fuel cell, making it possible to reliably detect the voltage of each cell of a reduced-thickness fuel cell, and to perform highly accurate control of electrical generation.

BRIEF DESCRIPTIONS OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
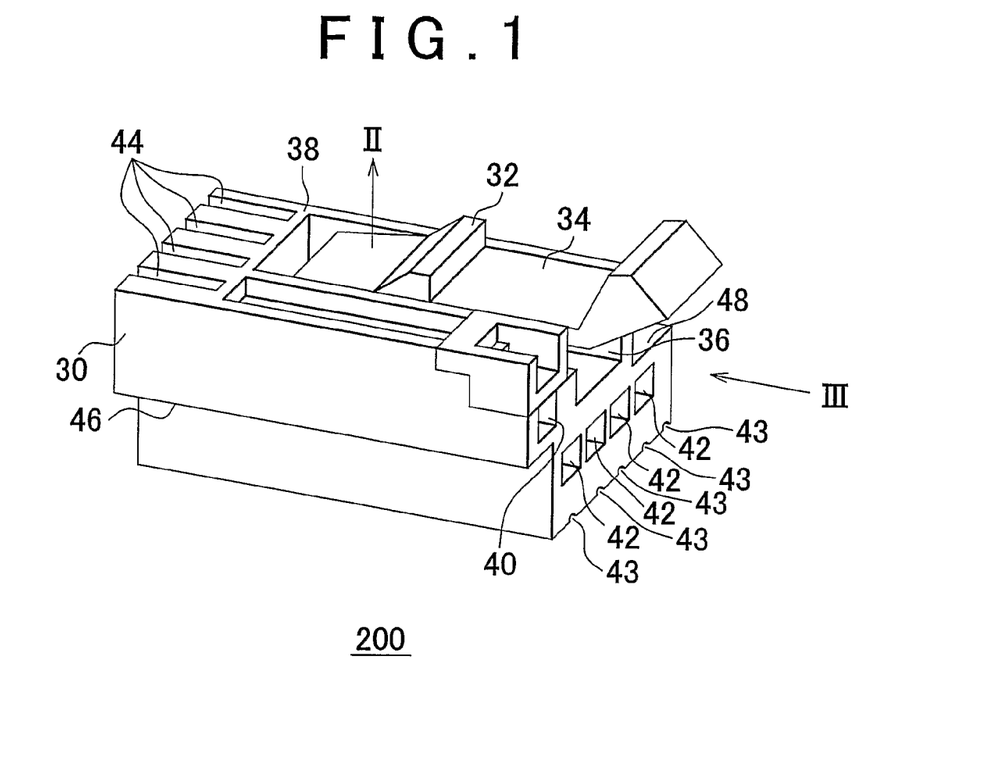
FIG. 1 shows an outer perspective view of a voltage detection connector according to the first embodiment of the present invention.
Figure 2:
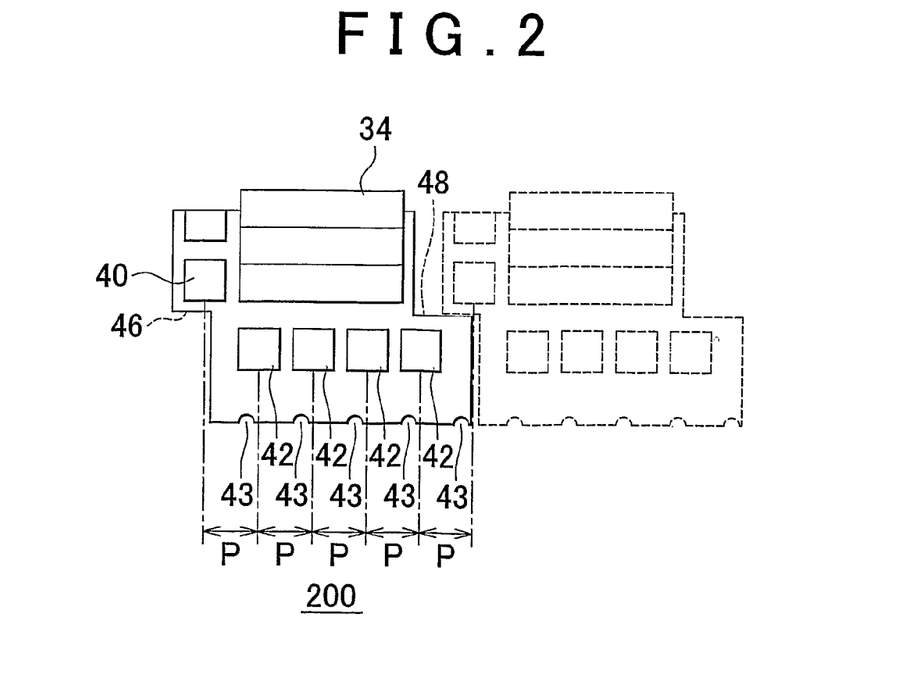
FIG. 2 shows a front view of a voltage detection connector according to the first embodiment of the present invention.

As shown in FIG. 1 and FIG. 2, a voltage detection connector 200 for a fuel cell in the first embodiment of the present invention includes a resin connector case 30. FIG. 1 is a perspective view showing the voltage detection connector 200, and FIG. 2 is a front view of the voltage detection connector 200 as seen from the front plane direction (the direction of the arrow III in FIG. 1).

A lever-shaped locking member 34 having a protruding mating part 32 is provided at the right side of the upper front part of the connector case 30. The locking member 34 is housed within a locking member housing 36 provided at the upper front part of the connector case 30. Part of the locking member 34 is fixed to the connector case 30 so that the locking member 34 is impelled in the upward direction of the connector case 30 (direction of arrow II in FIG. 1). The locking member 34 is provided so that when this happens, with no external force applied, the mating part 32 protrudes from the upper surface 38 of the connector case 30. The locking member 34 is also provided so that, when an external force is applied in the direction of the lower surface of the connector case 30, the protruding mating part 32 is housed within the locking part housing 36, so that the protruding mating part 32 is below the upper surface 38 of the connector case 30.

The structures of the locking member 34 and the locking member housing 36 are not limited to the above structures. It is sufficient if the foregoing structures enable the reliable fixing of the voltage detection connector 200 to the fuel cell 300 when the voltage detection connector 200 is attached to the fuel cell 300.

A primary terminal housing 40, which houses the detection terminals at a height substantially the same as the locking member 34, is provided at the left side of the upper left part of the connector case 30. Additionally, a secondary terminal housing 42 is provided also at the right side of the lower front part of the connector case 30, below the locking member 34. In this embodiment one primary terminal housing 40 is provided at the left side of the upper front part of the connector case 30, and four secondary terminal housings 42 are provided at the right side of the lower bottom part of the connector case 30, lined up at substantially the same height. The primary and secondary terminal housing parts 40, 42, respectively, as shown in FIG. 2, are disposed at the same spacing interval as the stacking pitch P of the cells in the fuel cell.

Spaces are provided in each of the primary and secondary terminal housing parts 40, 42, respectively, to enable the housing and attachment of detection terminals for the purpose of bringing out electrical interconnects from the electrodes brought out from each cell of the fuel cell. Each of the primary and secondary terminal housing parts 40, 42, respectively, as shown in the perspective view of FIG. 3, has a detection terminal 50 attached thereto.

Figure 4:
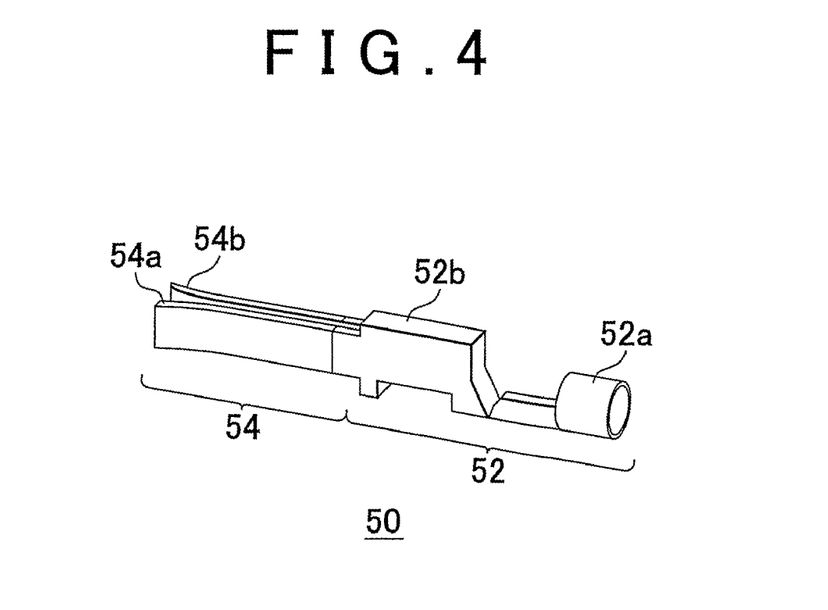
FIG. 4 shows an outer perspective view of a detection terminal in the first embodiment of the present invention.

The detection terminal 50 is formed from a material with high electrical conductivity, such as a metal. The terminal 50, as shown in FIG. 4, is formed by a wire mounting part 52 for mounting voltage detection wire, is connected to an electrode connection part 54 that is connected to an electrode of the fuel cell. The wiring mounting part 52 is, for example, formed by a metal tubular part 52a and a connection part 52b. The outer covering of an electrical cable is stripped away and an electrical cable 56 is inserted and crimped into the tubular part 52a. The connection part 52b is electrically and structurally connected to the tubular part 52a and the electrode connection part 54.

Figure 5:
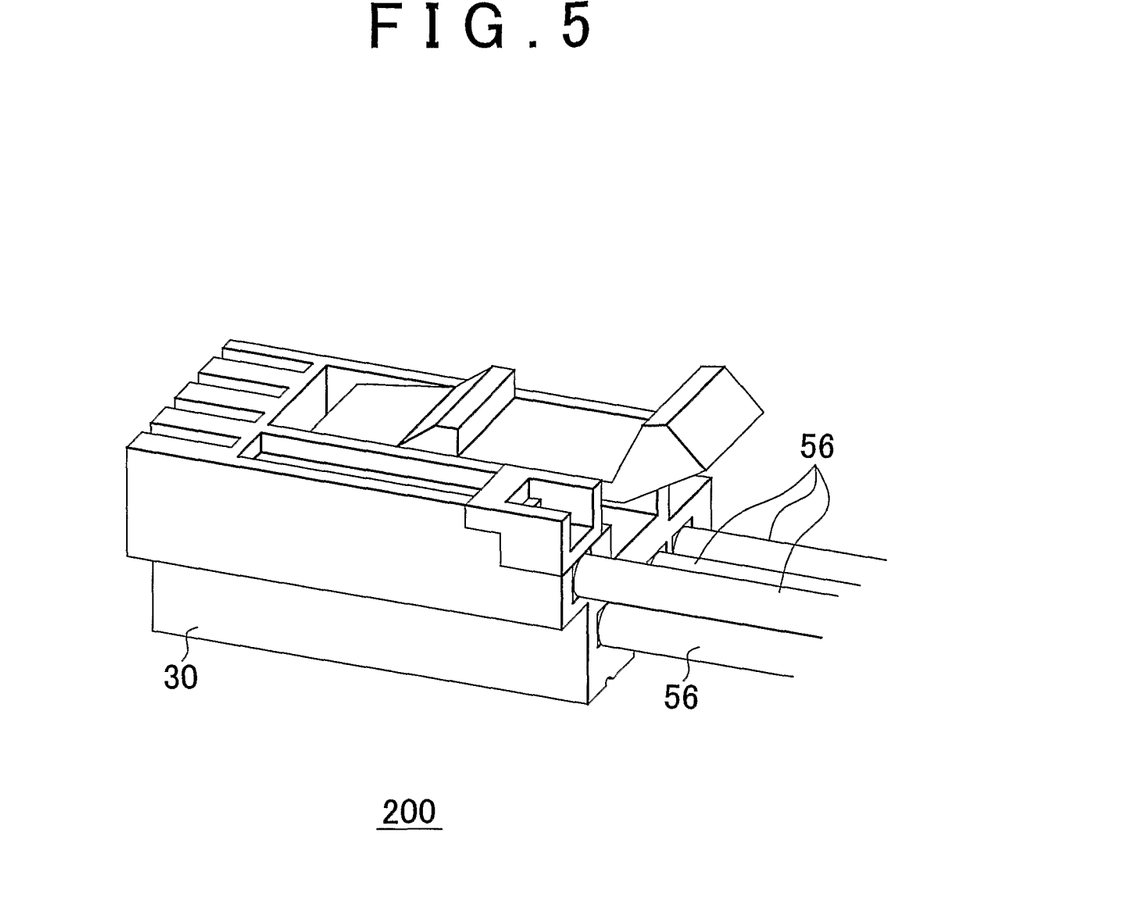
FIG. 5 shows an outer perspective view of a voltage detection connector with cables connected according to the first embodiment of the present invention.

FIG. 5 shows the voltage detection connector 200 with detection terminals 50, into which are crimped the electrical cables 56, attached to each of the terminal housing parts 40, 42. The cables 56 lead out from the front plane of the connector case 30 in this manner in the voltage detection connector 200.

The electrode connection part 54 can be configured by two rectangular shaped metal members 54a, 54b, that face one another at a prescribed spacing therebetween. The spacing between the metal members 54a, 54b may be slightly smaller than the thickness of the electrode of each cell of the fuel cell. This facilitates sandwiching of the fuel cell electrode between the electrode connection part 54. The end parts of the metal members 54a, 54b may be bent outward, so that the electrode may be easily inserted between the metal members 54a, 54b.

The structure of the detection terminal 50 is not limited to the foregoing, and it is sufficient that it may be housed in the connector case 30 and capable of electrically connecting the cable 56 to the electrode part of the fuel cell. For example, instead of the tubular part 52a for crimping the cable 56, the structure can be such that the core of the cable 56 may be soldered.

Figure 3:
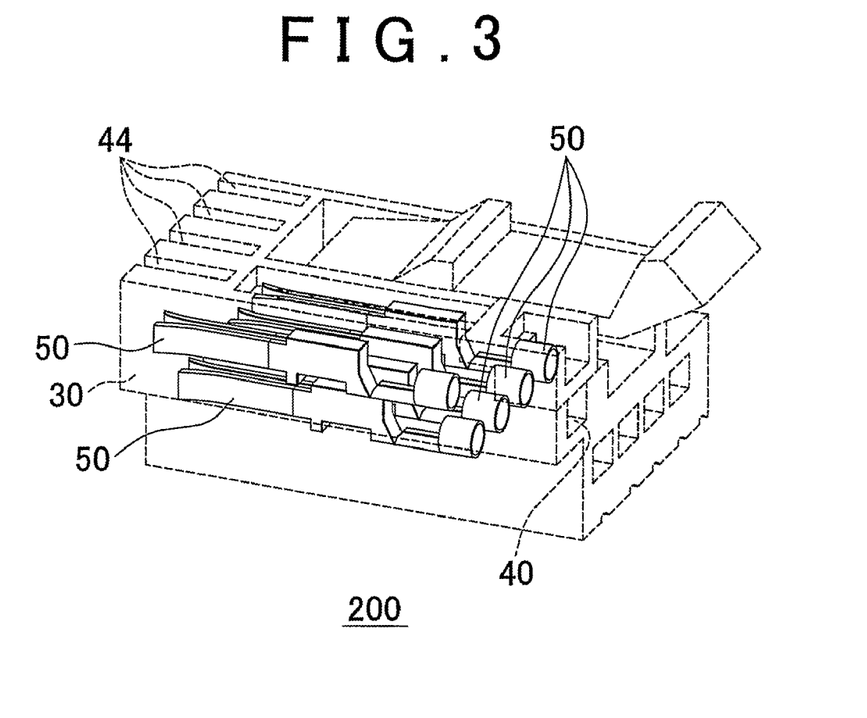
FIG. 3 shows a perspective view of the inner part of a voltage detection connector according to the first embodiment of the present invention.

A slit 44, provided at the rear of the connector case 30 (as shown in FIG. 1), extends from the upper surface to the lower surface of each of the terminal housing parts 40, 42. Each slit 44 is formed at a position corresponding to the respective terminal housing parts 40, 42. The slits 44 are disposed so that the spacing between neighboring slits 44 is equal to the stacking pitch P of the cells in the fuel cell. The slits 44 are provided so that, when a detection terminal 50 is attached to the terminal housing parts 40, 42, at least a part of the electrode connection part 54 of the detection terminal 50 protrudes into the slit 44. The detection terminal 50, as shown in FIG. 3, has a gap, formed by two rectangular shaped metal members 54a, 54b, which is along the opening direction of the slit 44.

As shown in FIG. 1 and FIG. 2, a part of the connector case 30 below the terminal housing parts 40 is cut away at a surface 46 from the front surface to the rear surface of the connector case 30. Also, as shown in FIG. 2, the connector case 30 above the terminal housing part 42 is cut away from the front surface to the rear surface of the connector case 30 at a surface 48, which is opposite the surface 46 in the case in which the connectors 200 are lined in a row. Stated differently, the connector case 30 has a first side surface and a second side surface opposite the first side surface. A first protruding part is formed on the first side surface, and a second protruding part is formed on the second side surface. The second protruding part is positioned below the first protruding part and protrudes in the direction opposite to the direction in which the first protruding part protrudes. That is, the first protruding part of one connector case 30 and the second protruding part of a second connector case 30 are combined, so that the surface 46 and the surface 48 mutually face one another, enabling the two connector cases 30 to be lined up adjacently.

The embodiment is not limited to the structure in which one terminal housing part 40 and detection terminal 50 are disposed at the upper level of the connector case 30, and four terminal housing parts 42 and detection terminals 50 are disposed at the lower level of the connector case 30. For example, the number of detection terminals 50 at the upper level may be increased, and the number of detection terminals 50 disposed at the lower level may be increased or decreased. In this case, as noted above, at least a part below the surface 46 is cut away, and at least a part above the surface 48 is cut away. In this manner, the surface 46 and the surface 48 are combined, enabling the two connector cases 30 to be lined up adjacently.

In this manner, by protruding parts at the upper level and the lower level of neighboring voltage detection connectors 200, it is possible to avoid interference between the connector cases 30 when voltage detection connectors 200 are adjacently attached. In doing this, by disposing an upper-level terminal housing part 40 at the same height as the locking member 34, it is possible to avoid interference between connector cases 30, while maintaining the same height of the voltage detection connector 200 as that of a connector according to the related art. The height of the overall fuel cell system, therefore, can be made the same as in the related art. This constitution is particularly effective in the case of a thin fuel cell.

As shown in FIG. 1 and FIG. 2, the lower surface of the connector case 30 includes a sliding groove 43 having a prescribed cross-sectional shape and extending from the front surface to the rear surface, for the purpose of positioning when the voltage detection connector 200 is attached to the fuel cell. In this embodiment, as shown in FIG. 2, the groove 43 is provided so that the spacing between neighboring grooves 43 is equal to the stacking pitch P of the cells of the fuel cell.

Figure 6:
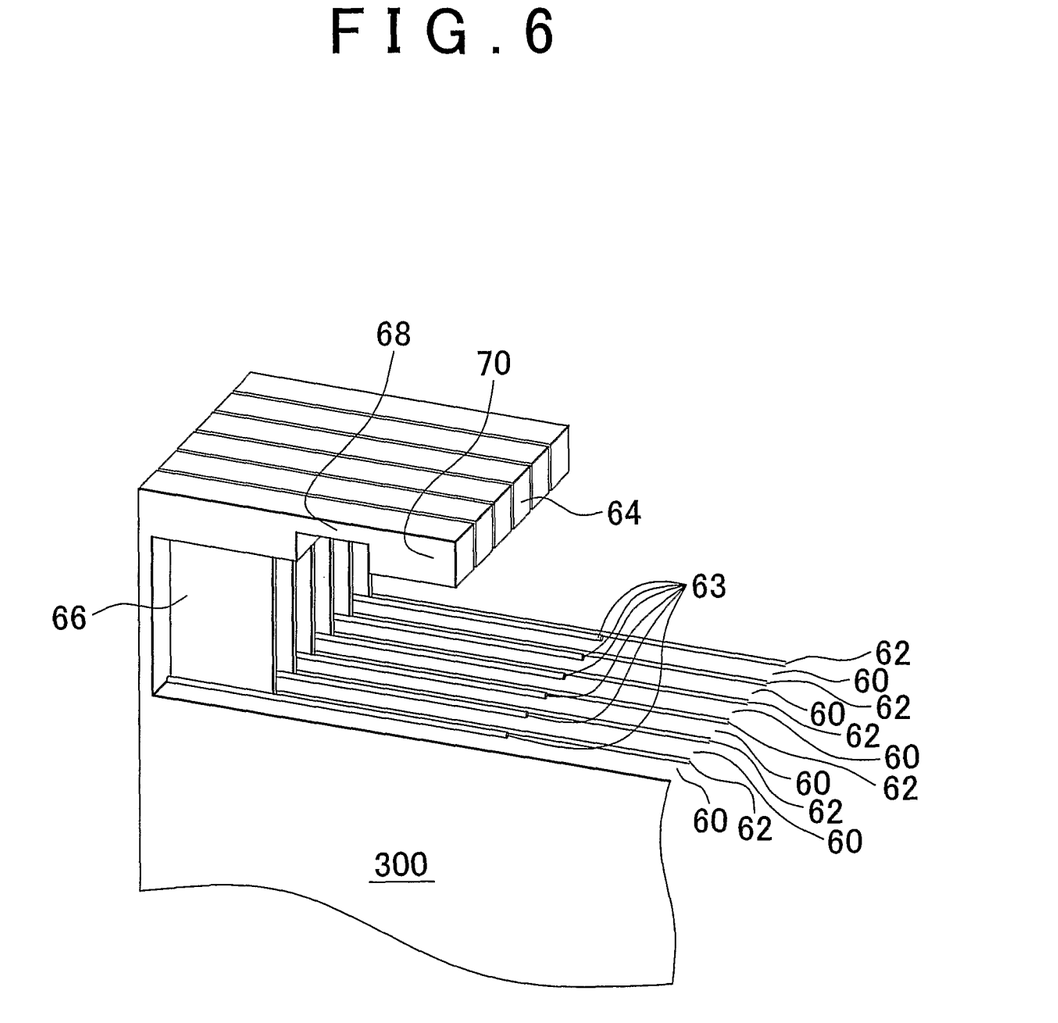
FIG. 6 shows an expanded outer perspective view of a part of a fuel cell according to the first embodiment of the present invention.

FIG. 6 is an expanded view of the region of the fuel cell 300 at which the voltage detection connector 200 is attached in this embodiment. In FIG. 6, part of the fuel cell 300 is cut away in the stacking direction to clearly show the attachment part of the voltage detection connector 200.

The fuel cell 300, as shown in FIG. 6, is formed by multiple stacked cells 60, which are the unit of electrical generation. Each cell 60 has an electrolyte membrane, made of an ion exchange membrane, which is sandwiched between an anode and a cathode, and further sandwiched outside by a pair of separators. The cells 60 are stacked so that the spacing between neighboring cells 60 is equal to the pitch P. The separators 62 have passages for supplying fuel gas, such as hydrogen gas and the like, and an oxidant gas, such as air, to the anode and to the cathode. By supplying fuel gas and oxidant gas via these passages, a chemical reaction occurs within the cell 60, and electricity is generated.

The attachment part of the voltage detection connector 200 is formed by forming a support part 64 protruding in the shape of a visor at the upper surface edge of the fuel cell 300. The support part 64 extends upward from the fuel cell 300 and is bent so that it faces opposite the upper surface of the fuel cell 300. The support part 64 is made of, for example, resin that is part of the cell 60. The spacing between the upper surface of the fuel cell 300 and the support part 64, that is, the inner spacing height, is made slightly larger than the height between the upper surface and the lower surface of the connector case 30 of the voltage detection connector 200. The protruding support part 64 has a center part 68 that is thinner than other parts thereof. By this center part 68, a mating part 70 that protrudes downwardly toward the upper surface of the fuel cell 300 is formed at the end of the support part 64. The mating part 70 is provided at a position that is opposite the mating part 32 provided in the locking member 34 of the voltage detection connector 200 when the voltage detection connector 200 is attached to the fuel cell 300.

An electrode part 66 protruding from the separator 62 is provided on the attachment part of the voltage detection connector 200 with the fuel cell 300. The electrode part 66 is provided so as to protrude into the space between the support part 64 protruding in a visor shape and the upper surface of the fuel cell 300. Because the spacing between neighboring cells 60 is the pitch P, spacing between neighboring electrode parts 66 is equal to the pitch P.

By making the support part 64 that includes the mating part 70 of resin and making the electrode part 66 that protrudes therewithin of metal, it is possible to achieve an improvement in structural strength over the related art, and to make the pitch P between cells 60 approximately one-half of the pitch in the related art.

The structure of the mating part 70 provided in the fuel cell 300 is not limited to the foregoing. The structure of the mating part 70 is sufficient if, by mating with the mating part 32 of the locking member 34, the voltage detection connector 200 is fixed to the fuel cell 300. Forming the mating part 70 by extending the resin forming the cell 60 upwardly above the fuel cell 300, however, it is advantageous from the standpoint of being able to configure the mating part 70 extending in the stacking direction of the cells 60 by merely stacking the cells 60. Adopting a structure in which the voltage detection connector 200 is inserted in the lateral direction into the space that is made by the support part 64 and extends along the upper surface of the fuel cell 300 has the advantage that when the fuel cell 300 is subjected to water and the like, the visor-shaped support part 64 protects the connection parts of the electrode parts 66, the detection terminals 50, and the cables 56.

A guide part 63 is provided in the fuel cell 300 so that it is opposite a sliding groove 43 provided in the voltage detection connector 200. The guide part 63 can be formed from a protrusion having a cross-sectional shape that fits the cross-sectional shape of the groove 43 that extends along a direction that is perpendicular to the stacking direction on the upper surface of the resin of an electrolyte membrane. Because the cells 60 are stacked with a pitch P, the guide parts 63 are also arranged in a row with the pitch P.

Figure 7:
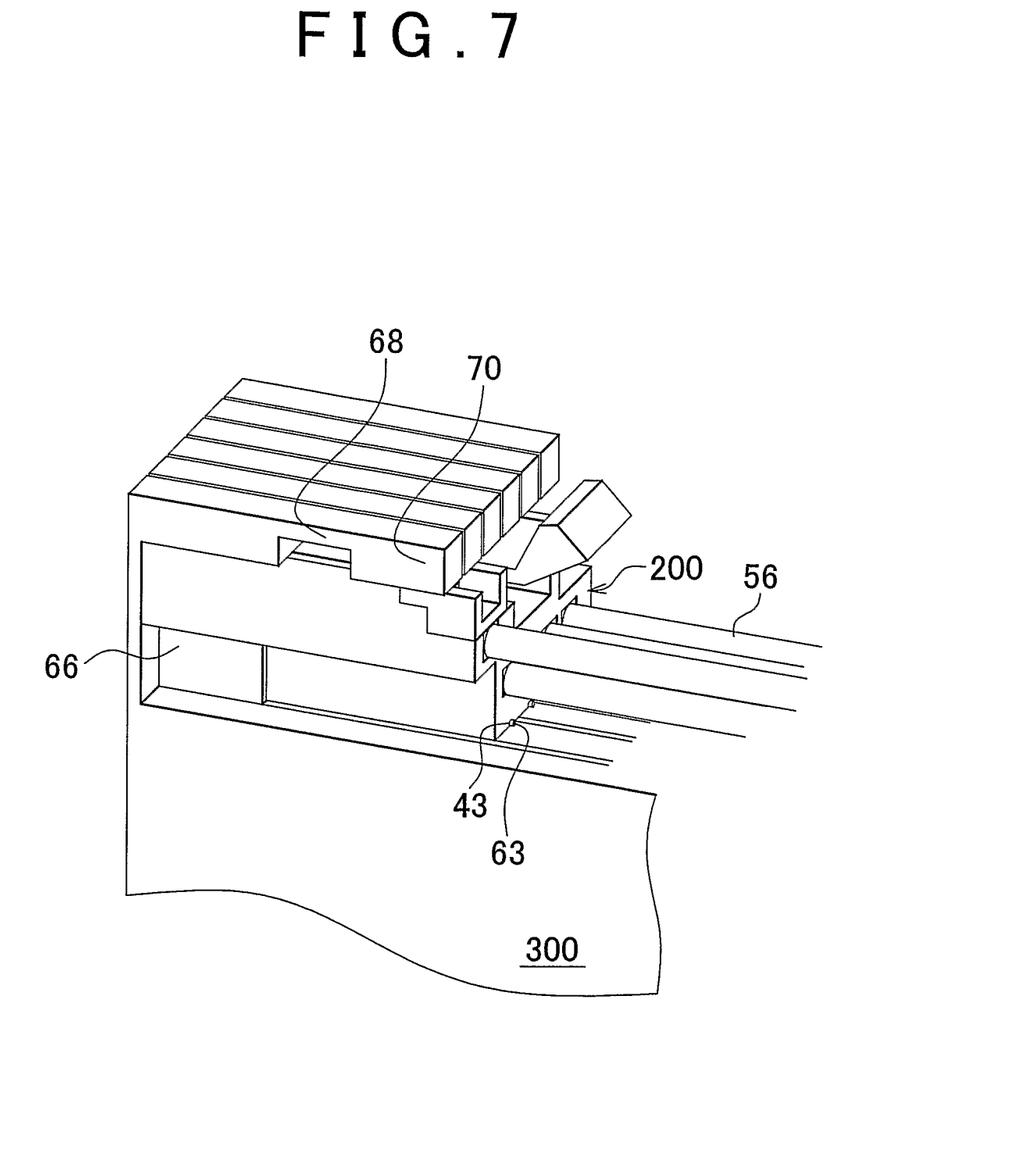
FIG. 7 shows a perspective view of a fuel cell to which a voltage detection connector according to the first embodiment of the present invention is attached.

FIG. 7 is a perspective view of a fuel cell 300 with the voltage detection connector 200 connected thereto. In FIG. 7, in order to show clearly the connection condition of the voltage detection connector 200, part of the fuel cell 300 is cut away in the stacking direction.

When attaching the voltage detection connector 200, the groove 43 provided on the lower surface of the connector case 30 is aligned with the guide part 63 provided on the upper surface of the fuel cell 300, and the voltage detection connector 200 is inserted between the support part 64 of the fuel cell 300 and the upper surface of the fuel cell 300, so as to slide the groove 43 relative to the guide part 63. When this is done, the voltage detection connector 200 is attached so that the electrode part 66 of the fuel cell 300 passes through the slit 44 of the voltage detection connector 200. The voltage detection connector 200 is inserted so that the mating part 32 of the locking member 34 of the voltage detection connector 200 mates with the mating part 70 of the fuel cell 300. By doing this, it is possible to attach the voltage detection connector 200 reliably to the fuel cell 300. By pressing the end part of the locking member 34 downward, it is possible to release the mating between the mating part 32 and the mating part 70, enabling removal of the voltage detection connector 200 from the fuel cell 300.

By using the guide part 63 in this manner, it is possible to easily attach the voltage detection connector 200 so that the electrode parts 66 are sandwiched between the metal members 54a, 54b of each of the detection terminals 50. By providing a guide part 63 that is longer than the length of the support part 64 in the protruding direction, it becomes possible to fit and position together the guide part 63 and the groove 43 before inserting the voltage detection connector 200 into the space formed by the support part 64, and possible to perform more effective guiding at the time of attachment.

When attaching another voltage detection connector 200 in a neighboring position relative to an already attached voltage detection connector 200, by fitting the groove 43 of the another voltage detection connector 200 to the guide part 63 at the side of the already-connected voltage detection connector 200, it is possible to prevent an offset in the attachment position.

Figure 8:
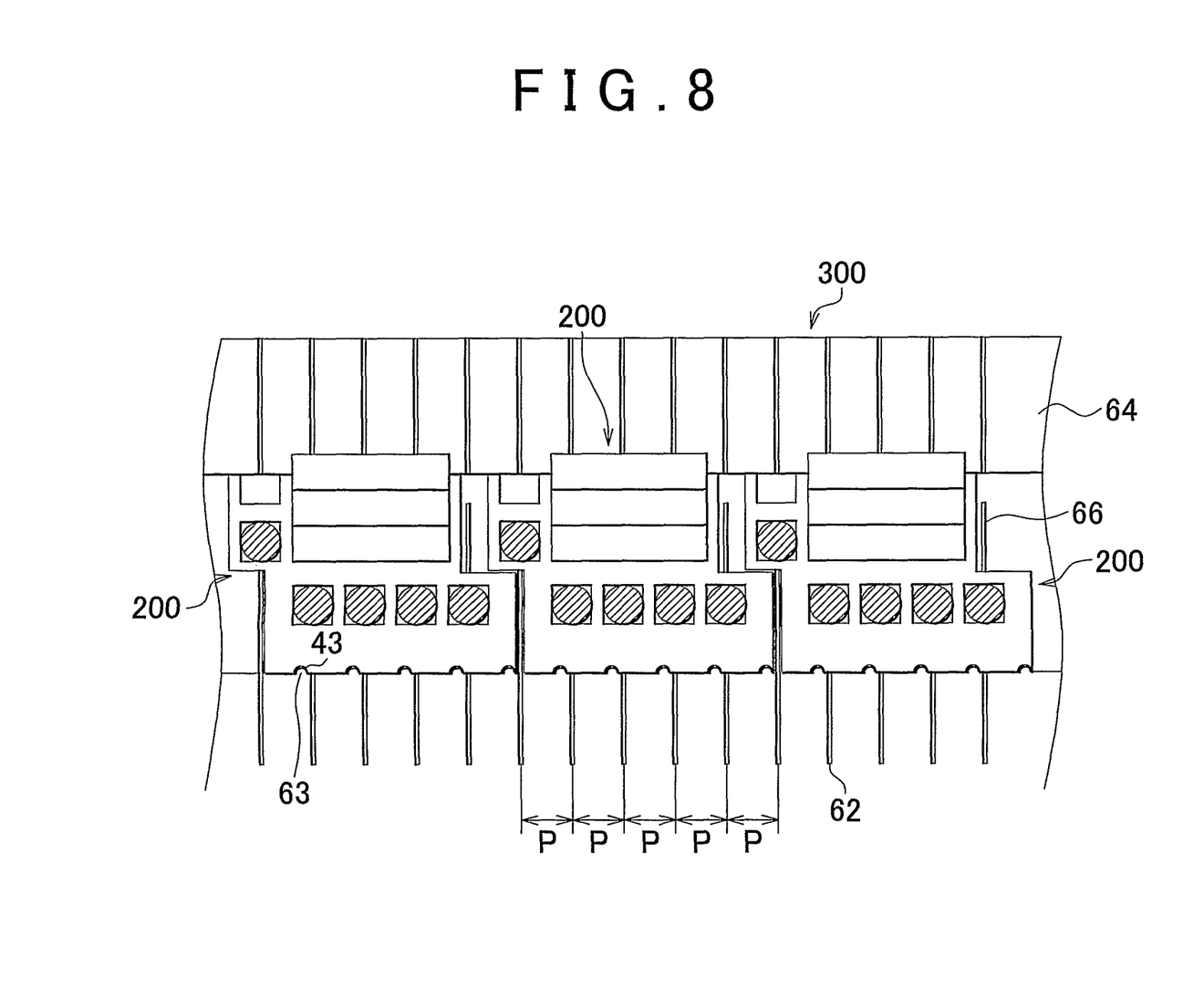
FIG. 8 shows a front view of a fuel cell to which a voltage detection connector according to the first embodiment of the present invention is attached.

FIG. 8 is a front view of the case in which a plurality of voltage detection connectors 200 are lined in a row and connected to a fuel cell 300. In FIG. 8, part of the fuel cell 300 is cut away in the stacking direction to clearly show the attachment part of the voltage detection connector 200.

As shown in FIG. 8, the voltage detection connectors 200 are connected to the fuel cell 300 so that they are adjacent to each other in a row. As shown in FIG. 1 and FIG. 2, the connector case 30 is shaped so that the part below the surface 46 is cut away and the part above the surface 48 is cut away. That is, in addition to providing at least one terminal housing part 42 at the lower level, the width of the locking member 34 provided on the upper level is made narrower than the lower level provided with the terminal housing part 42, and at least one terminal housing part 40 is provided having a height that is substantially the same as the locking member 34. By doing this, a protruding part extending toward one side of the upper level of the voltage detection connector 200 and a protruding part extending toward the other side of the lower level are provided. In this manner, attachment is possible of neighboring voltage detection connectors 200 so that there is mutual mating between a protruding part on one side of the upper level of one with the protruding part on the other side of the lower level of the other.

If a cable is lead out vertically from the upper surface of the fuel cell 300, there is the need to bend the cable 56 in a direction along the upper surface of the fuel cell 300, and a load is placed on the cable 56, leading to the problem of the cable 56 being easily damaged. In the voltage detection connector 200 according to this embodiment, a cable for voltage detection is lead out from the front surface of the voltage detection connector 200, so that it is possible to wire the cable 56 in the direction along the upper surface of the fuel cell 300 without bending the cable 56. By doing this, it is possible to prevent damage to the cable 56.

Although this embodiment has a groove 43 and a guide part 63 provided with the same pitch as the stacking pitch P of the fuel cell 300, the embodiment is not limited to this. For example, the groove 43 and the guide part 63 may be disposed with a pitch that is larger than the stacking pitch P, to prevent the voltage detection connector 200 from being attached with an offset of just the pitch P. Also, the guide part 63 may be provided on the lower surface of the connector case 30 of the voltage detection connector 200 and the groove 43 may be provided on the upper surface of the fuel cell 300.

The connector case 30 and the fuel cell 300 are not limited to the shape of the embodiment described above. For example, a configuration may be adopted in which, as shown in FIG. 11, the groove 43 is provided on the lower surface of a connector case 10 having a rectangular cross-section and not having a first protruding part and second protruding part, and the guide part 63 can be provided on an attachment part of the fuel cell 300 having a shape that is fitted to the shape of the connector case 10.

Figure 9:
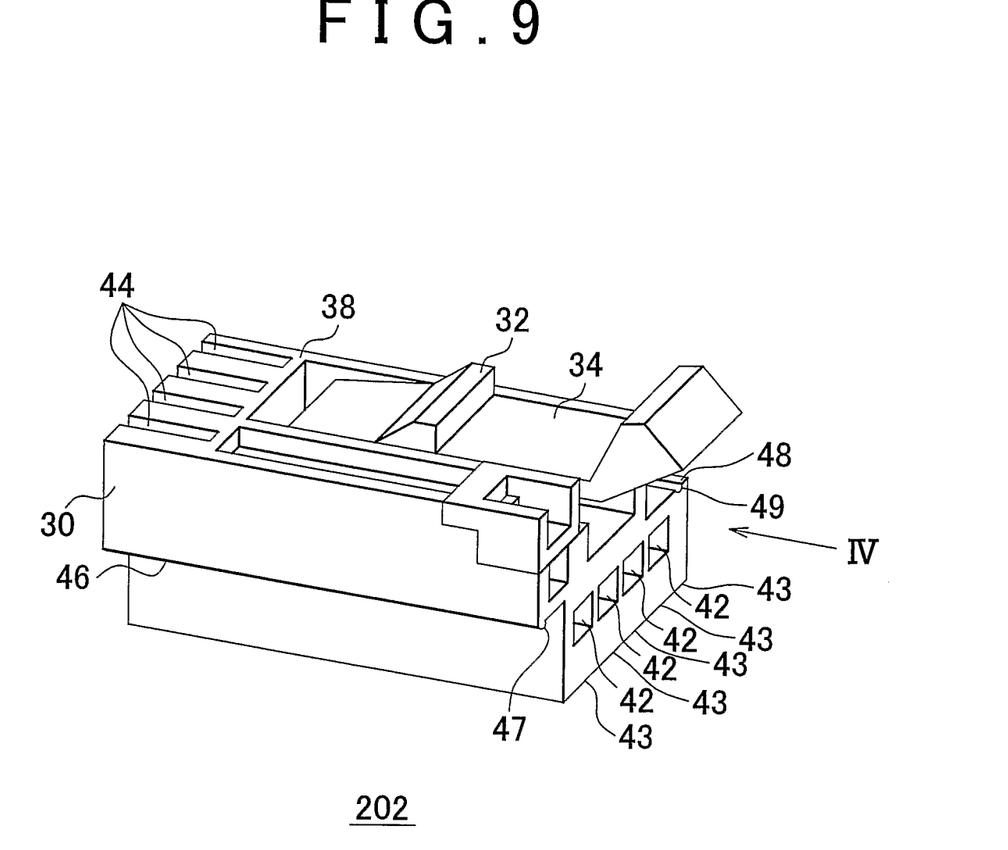
FIG. 9 shows an outer perspective view of a voltage detection connector according to a variation example of the first embodiment of the present invention.
Figure 10:
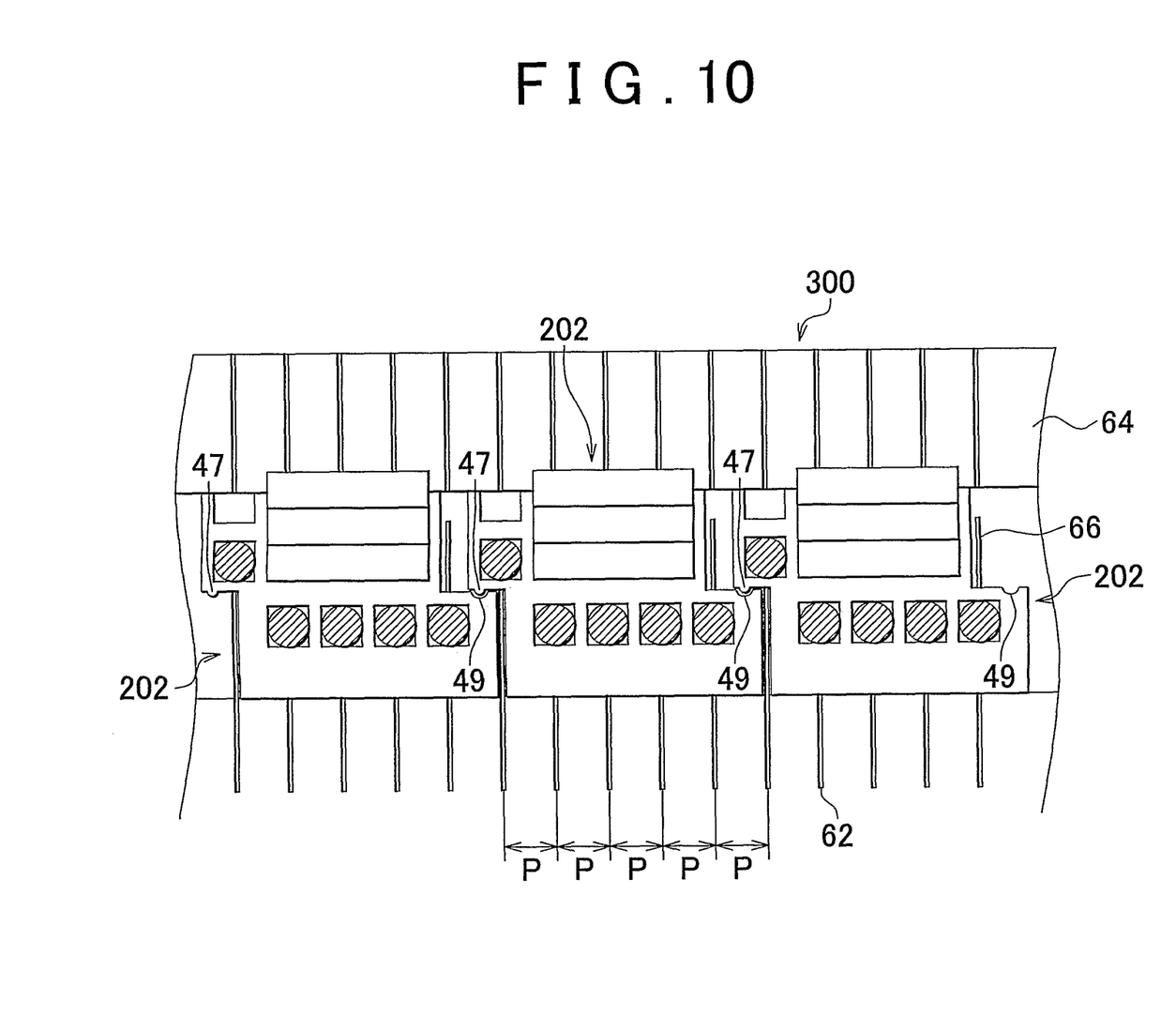
FIG. 10 shows a front view of a fuel cell to which a voltage detection connector according to a variation example of the first embodiment of the present invention is attached.

FIG. 9 and FIG. 10 show an alternative embodiment of a voltage detection connector 202 for a fuel cell in accordance with the present invention. FIG. 9 is a perspective view of the voltage detection connector 202, and FIG. 10 is a front view of the voltage detection connector 202 as seen from the front plane direction (the direction of the arrow IV in FIG. 9). Elements that are the same as the foregoing embodiment are assigned the same reference numerals and are not described herein.

In this variation example, a guide part 47 and a groove 49 are provided, respectively, on a surface 46, which is the lower surface of the first protruding part and a surface 48, which is the upper surface of the second protruding part. The guide part 47 and the groove 49 are formed so as to extend from the front surface to the rear surface of the connector case 30, along the attachment direction of the connector case 30, which in this case is the forward direction of the connector case 30. The guide part 47 and the groove 49 are formed so that, if the voltage detection connector 202 is properly attached to the fuel cell 300, they are at opposing positions in a region in which the surface 46 and the surface 48 of neighboring voltage detection connectors 202 overlap.

When the voltage detection connector 202 is attached, it is inserted into the space between the support part 64 of the fuel cell 300 and the upper surface of the fuel cell 300. When this is done, the voltage detection connector 202 is attached so that the electrode 66 of the fuel cell 300 passes through the slit 44 of the voltage detection connector 202. The voltage detection connector 202 is inserted so that the mating part 32 of the locking member 34 of the voltage detection connector 202 mates with the mating part 70 of the fuel cell 300.

When attaching a voltage detection connector 202 in a neighboring position relative to an already attached voltage detection connector 202, the guide part 47 provided on the surface 46 of the voltage detection connector 202 is aligned with the groove 49 formed on surface 48 of the already-attached voltage detection connector 202, and the voltage detection connector 202 is inserted between the support part 64 of the fuel cell 300 and the upper surface of the fuel cell 300, so that the guide part 47 and the groove 49 are caused to slide.

By using the guide part 47 and the groove 49 in this manner, it is possible to prevent offset of the attachment position of the voltage detection connector 202, and possible to easily sandwich the electrode part 66 between the metal members 54a, 54b of each detection terminal 50.

If the groove 49 is provided in the lower surface of the surface 46 of the connector case 30 and the guide part 47 is provided in the upper surface of the surface 48, it is not necessary to provide the groove 43 or the guide part 63 on the upper surface of the fuel cell 300.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, fewer, or only a single element, are also within the scope of the appended claims.

The invention claimed is:

1. A voltage detection connector for a fuel cell comprising:
   at least one detection terminal connectable to an electrode provided on the fuel cell formed by the stacking of multiple cells; and
   a connector case having either a channel-shaped groove or a protruding guide for mating with and for causing sliding with a protruding guide or channel-shaped groove provided on the fuel cell when the connector is attached to the fuel cell,
   wherein a longitudinal direction of the channel-shaped groove or protruding guide provided on the connector case extends in an insertion direction when the connector is attached to the fuel cell,
   wherein the channel-shaped groove or protruding guide is provided on a lower surface of the connector case which contacts the fuel cell, and
   wherein the channel-shaped groove or the protruding guide extends in a direction perpendicular to a direction of at least one protruding part of the connector case.

2. The voltage detection connector for a fuel cell according to claim 1, wherein the channel-shaped groove or protruding guide of the connector case is provided at a pitch equal to the stacking pitch of the cells.

3. A voltage detection connector for a fuel cell comprising:
   a connector case having a front surface, a back surface, a top surface, a bottom surface, a first side surface, and a second side surface opposite the first side surface, wherein a first protruding part is formed on the first side surface, and a second protruding part is formed on the second side surface and the second protruding part is positioned below the first protruding part and protrudes in a direction opposite to a direction in which the first protruding part protrudes, and a protruding guide or channel-shaped groove is provided on a lower surface of the first protruding part, a channel-shaped groove is provided on an upper surface of the second protruding part when the protruding guide is provided on the lower surface of the first protruding part, or a protruding guide is provided on the upper surface of the second protruding part when the channel-shaped groove is provided on the lower surface of the first protruding part and
   a detection terminal provided on the first protruding part and connectable to an electrode provided on the fuel cell formed by the stacking of multiple cells,
   the protruding guide provided on the lower surface of the first protruding part configured to mate with a channel-shaped groove provided on an upper surface of a second protruding part of an adjacent voltage detection detector, or the channel-shaped grooved provided on the lower surface of the first protruding part mates with a protruding part guide provided on an upper surface of a second protruding part of an adjacent voltage detection detector.

4. The voltage detection connector according to claim 3, wherein the channel-shaped groove or protruding guide provided on the first protruding part of the connector case extends in the insertion direction when the connector is attached to the fuel cell.

5. A fuel cell comprising:
   a channel-shaped groove or a protruding guide for mating with and for causing sliding with a protruding guide or channel-shaped groove provided on a connector when the connector for detecting the voltage of cells contained in the fuel cell formed by the stacking of multiple cells, is attached to the fuel cell,
   wherein a longitudinal direction of the channel-shaped groove or protruding guide provided on the fuel cell extends in an insertion direction when the connector is attached to the fuel cell, and
   wherein the channel-shaped groove or the protruding guide extends in a direction perpendicular to a direction of at least one protruding part of a connector case of the connector.

6. The fuel cell adapted for the voltage detection connector according to claim 5, wherein the channel-shaped groove or protruding guide provided on the fuel cell is provided at a pitch equal to the stacking pitch of the cells.

7. The fuel cell according to claim 5, wherein metal members of each detection terminal of the voltage detection connector contact with an electrode that is provided on the fuel cell, and set ahead of the voltage detection connector moving direction, by either the channel-shaped groove or the protruding guide being mated with and being sliding with a protruding guide or channel-shaped groove provided in the voltage detection connector.

8. The fuel cell according to claim 5, further comprising an attachment part of the voltage detection connector formed by a support part made of resin, and projecting outwardly over an upper surface edge of the fuel cell.

* * * * *

UNITED STATES PATENT AND TRADEMARK OFFICE
CERTIFICATE OF CORRECTION

PATENT NO.        : 8,470,492 B2                                Page 1 of 1
APPLICATION NO.   : 12/087926
DATED             : June 25, 2013
INVENTOR(S)       : Akira Aoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1347 days.

Signed and Sealed this
Eighth Day of September, 2015

Michelle K. Lee
*Director of the United States Patent and Trademark Office*